(12) United States Patent
Han

(10) Patent No.: US 9,884,748 B2
(45) Date of Patent: Feb. 6, 2018

(54) ELEVATOR SYSTEM

(71) Applicant: Inventio AG, Hergiswil (CH)

(72) Inventor: Lin Han, Shanghai (CN)

(73) Assignee: INVENTIO AG, Hergiswil (CH)

( * ) Notice: Subject to any disclaimer, the term of this patent is extended or adjusted under 35 U.S.C. 154(b) by 0 days.

(21) Appl. No.: 15/038,782

(22) PCT Filed: Dec. 16, 2014

(86) PCT No.: PCT/EP2014/077869
§ 371 (c)(1),
(2) Date: May 24, 2016

(87) PCT Pub. No.: WO2015/091421
PCT Pub. Date: Jun. 25, 2015

(65) Prior Publication Data
US 2016/0376127 A1 Dec. 29, 2016

(30) Foreign Application Priority Data
Dec. 17, 2013 (EP) .................................... 13197713

(51) Int. Cl.
*B66B 15/04* (2006.01)
*B66B 11/00* (2006.01)
*B66B 15/02* (2006.01)
*B66B 1/24* (2006.01)
*B66B 5/00* (2006.01)
*B66B 7/06* (2006.01)
*F16H 55/36* (2006.01)

(52) U.S. Cl.
CPC ............... *B66B 15/04* (2013.01); *B66B 1/24* (2013.01); *B66B 5/0018* (2013.01); *B66B 7/062* (2013.01); *B66B 11/0065* (2013.01); *B66B 15/02* (2013.01); *F16H 55/36* (2013.01)

(58) Field of Classification Search
CPC ......... B66B 15/04; B66B 1/24; B66B 5/0018; B66B 7/062; B66B 15/02
USPC ......................................................... 187/247
See application file for complete search history.

(56) References Cited

U.S. PATENT DOCUMENTS

| 782,978 | A | * | 2/1905 | Magruder | ............... F16H 13/02 474/131 |
| 993,684 | A | * | 5/1911 | Vom Hoff | ............. F16H 7/1281 474/131 |
| 1,626,240 | A | * | 4/1927 | Kosken | ................... F16H 55/24 474/131 |
| 1,820,427 | A | | 8/1931 | Birmann | |
| 3,464,282 | A | * | 9/1969 | Grobowski | ............... F16H 7/02 474/135 |
| 3,608,389 | A | * | 9/1971 | Christian | ............. B66D 1/7415 474/109 |

(Continued)

FOREIGN PATENT DOCUMENTS

| DE | 19632850 A1 | 2/1998 |
| EP | 1626026 A2 | 2/2006 |

(Continued)

*Primary Examiner* — David Warren
(74) *Attorney, Agent, or Firm* — William J. Clemens; Shumaker, Loop & Kendrick, LLP

(57) ABSTRACT

An elevator system includes a suspension traction device guided over at least one pulley and at least one counter pulley located adjacent to the pulley. The suspension traction device is guided between the pulley and the at least one counter pulley.

13 Claims, 3 Drawing Sheets

(56) References Cited

U.S. PATENT DOCUMENTS

| | | | | |
|---|---|---|---|---|
| 3,704,017 A * | 11/1972 | Young | | A63B 63/083 |
| | | | | 187/348 |
| 3,831,870 A * | 8/1974 | Daniel | | B65H 67/04 |
| | | | | 242/474.9 |
| 3,851,752 A * | 12/1974 | Densmore | | E21F 13/02 |
| | | | | 198/304 |
| 4,193,310 A * | 3/1980 | Boyer | | D06F 58/08 |
| | | | | 384/417 |
| 4,389,228 A * | 6/1983 | Leunig | | B01D 46/02 |
| | | | | 242/373 |
| 4,518,372 A * | 5/1985 | Dye | | F16C 13/006 |
| | | | | 474/199 |
| 4,557,707 A * | 12/1985 | Thomey | | F16H 7/1218 |
| | | | | 474/101 |
| 4,600,070 A * | 7/1986 | Thurner | | A01B 33/082 |
| | | | | 172/125 |
| 5,186,283 A | 2/1993 | Salmon | | |
| 5,921,352 A | 7/1999 | Garrido et al. | | |
| 5,938,551 A * | 8/1999 | Warner | | A63B 21/154 |
| | | | | 474/111 |
| 6,012,998 A * | 1/2000 | Schutz | | F16H 55/56 |
| | | | | 474/199 |
| 6,220,982 B1 * | 4/2001 | Kawashima | | F16H 55/44 |
| | | | | 384/536 |
| 6,267,205 B1 | 7/2001 | Piech et al. | | |
| 6,273,244 B1 * | 8/2001 | Dingeldein | | B65G 15/08 |
| | | | | 198/824 |
| 7,926,622 B2 * | 4/2011 | Henneau | | B66B 5/00 |
| | | | | 187/393 |
| 9,326,446 B2 * | 5/2016 | Cmich | | A01D 69/08 |
| 2006/0163006 A1 * | 7/2006 | Strebel | | B66B 1/42 |
| | | | | 187/249 |
| 2006/0260878 A1 * | 11/2006 | Hashiguchi | | B66B 11/0226 |
| | | | | 187/249 |
| 2007/0012520 A1 * | 1/2007 | Hayashi | | B66F 9/08 |
| | | | | 187/228 |
| 2007/0093334 A1 * | 4/2007 | Ach | | B66B 7/062 |
| | | | | 474/238 |
| 2007/0213154 A1 * | 9/2007 | Broyan | | B66B 9/02 |
| | | | | 474/148 |
| 2008/0067009 A1 * | 3/2008 | Ach | | B29D 29/10 |
| | | | | 187/250 |
| 2008/0067010 A1 * | 3/2008 | Ach | | B29D 29/10 |
| | | | | 187/250 |
| 2009/0166132 A1 | 7/2009 | Ach | | |
| 2010/0133046 A1 * | 6/2010 | Allwardt | | B66B 7/08 |
| | | | | 187/251 |
| 2010/0173737 A1 * | 7/2010 | Coirault | | F16H 7/24 |
| | | | | 474/130 |
| 2010/0234151 A1 * | 9/2010 | Lin | | F16H 55/54 |
| | | | | 474/17 |
| 2011/0005869 A1 * | 1/2011 | Hinton | | B64G 5/00 |
| | | | | 187/414 |
| 2011/0139548 A1 | 6/2011 | Bacon | | |
| 2011/0160014 A1 * | 6/2011 | Kawahara | | F16G 5/20 |
| | | | | 474/148 |
| 2012/0006627 A1 * | 1/2012 | Carparelli | | B66B 5/12 |
| | | | | 187/266 |
| 2015/0210511 A1 * | 7/2015 | Zapf | | B66B 15/04 |
| | | | | 187/266 |
| 2017/0081151 A1 * | 3/2017 | Han | | B66B 15/02 |

FOREIGN PATENT DOCUMENTS

| | | |
|---|---|---|
| JP | 2001163541 A | 6/2001 |
| WO | 2011104423 A1 | 9/2011 |

* cited by examiner

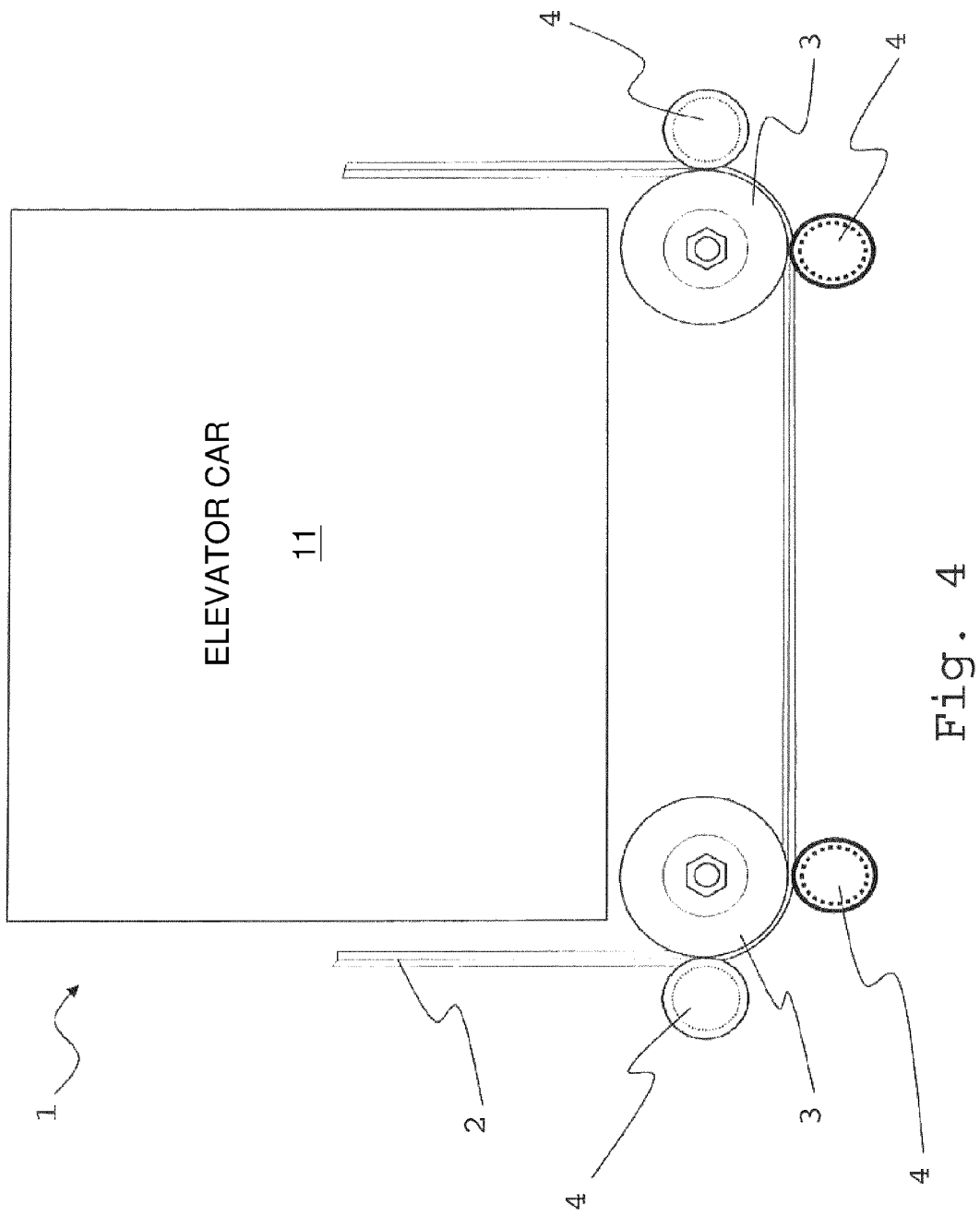

ELEVATOR SYSTEM

FIELD

The invention relates to an elevator system including suspension traction means or device guided over a pulley and at least one counter pulley located adjacent to the pulley whereby the suspension traction means or device is guided between the pulley and the at least one counter pulley.

BACKGROUND

A suspension traction means (STM) is a rope or belt shaped means or device used in elevator systems for suspending and driving an elevator car. In particular, if belt shaped STM made of a plastic material is used, there is the risk that the STM may move axially related to a pulley, over which the STM is guided, and slip or jump off the pulley when the STM is not held taut enough, e.g. when the elevator car suddenly stops, or when STM is subject to a diagonal pull. To avoid this problem, in the prior art cover shields are placed at least partially around the pulley to avoid the STM from moving away from the pulley. An example of such a cover shield is disclosed in EP 1 626 026 A2.

The cover shield can however be damaged and/or deformed when the STM moves away from the pulley. A damaged and/or deformed cover shield may itself further damage the STM or could not avoid reliably the STM from slipping or jumping off the pulley.

SUMMARY

It is therefore the aim of the present invention to provide an elevator system which solves the problems of known systems and in particular which can reliably avoid STM from jumping or slipping off a pulley.

The elevator system comprises a STM guided over at least one pulley.

At least one counter pulley is located adjacent to the pulley and the STM is driving the pulley. That means, that the pulley is passively driven, therefore the pulley is driven by the STM. The STM is guided between the pulley and the at least one counter pulley. In such a way it is possible to avoid the STM from slipping or jumping off the pulley when the STM is not held taut enough. Since the counter pulley is rotatable arranged near the pulley, if the STM is not correctly guided over the pulley and comes into contact with the counter pulley, the latter will rotate, thus reducing the risk of damage of the STM compared to known cover shields. Therefore, the counter pulley can be actively used for preventing the STM from jumping or slipping off the pulley while reducing the risk of damage of the STM itself.

In a preferred embodiment of the present invention, the counter pulley has a central section with a first diameter and at least one side wall with a second diameter larger than the first diameter. The central section of the counter pulley has preferably a width, which substantially corresponds to the width of the STM. Therefore, the STM can be guided through the slot formed by the central section. The side walls prevent the STM from moving axially related to the rotating axis of the pulley and the counter pulley. As an alternative only one end portion of the counter pulley may have a side wall with a second diameter larger than the first diameter while the pulley may also have one end portion with a side wall with a larger diameter than the rest of the pulley, whereby the side wall of the pulley is located opposed to the side wall of the counter pulley, thus forming a slot for guiding the STM and achieving the same effect. Alternatively, the counter pulley may not feature side walls, while the pulley may feature side walls high enough to avoid lateral motion of the STM.

In a further embodiment of the present invention, the central section of the counter pulley has a first width and the pulley has a second width, whereby the ratio of the second width to the first width is between 1 and 1.8, preferably 1.125. The first width is preferably between 25 cm and 35 cm, more preferably 32 cm, and the second width is preferably between 35 cm and 45 cm, more preferably 36 cm.

In another embodiment of the present invention, a relationship between the first diameter and the second diameter fulfils the following relationship: A difference between the second diameter and the first diameter is greater or equal than 4 cm, preferably greater or equal than 6.2 cm. Therefore the STM can be guided by the counter pulley.

The pulley and the counter pulley are preferably made of a metal like aluminum, copper, steel or alloys thereof or a plastic material, whereby the counter pulley may be made of the same material as the pulley or a different material.

In a preferred embodiment of the present invention, the counter pulley is positioned in such a manner that the STM is not in contact with the counter pulley when the STM is correctly guided over the pulley. With this embodiment, wear of the STM can be effectively reduced while reliably preventing the STM from jumping or slipping off the pulley. This preferred embodiment also prevents the counter pulley from damaging or cutting the STM when the STM is not correctly positioned, while avoiding further movement of the STM away from the pulley.

In a further embodiment of the present invention the distance between the rotational axes of the counter pulley and the pulley is alterable. Therefore the rotational axis of the counter pulley can be mounted in such a manner that the position of the rotational axis of the counter pulley is alterable. In case of for instance the STM touching the counter pulley or in case of the STM pressing against the counter pulley with a higher force than normal, the axis of the counter pulley is repositioned in such a manner, that the distance between the two axes will be increased and vice versa. Therefore the axis of the counter pulley can be mounted in spring bearings or the like.

In a further embodiment of the present invention, the pulley is a car pulley. Car pulleys are normally more exposed to the problem solved by this invention, because the STM are there more subject to diagonal pull due to inhomogeneous loading of the car and thus tend to slip or jump off a pulley more often than pulleys located elsewhere, e.g. at a counter weight or in a frame of the hoistway. Further preferred, the pulley is located under a car.

In a further embodiment of the present invention, two counter pulleys are located adjacent to the pulley. This is in particular advantageous when a STM has an arc of contact around the pulley of 80° or more. Depending on the arc of contact of the STM around the pulley and the diameter of the counter pulley, a plurality of counter pulleys may be arranged adjacent to the pulley.

The STM is preferably a belt shaped STM made at least partially of a plastic material. The belt shaped STM may include a core with one or more longitudinal-arranged reinforcing means made of a high-tensile material such as steel, Kevlar or the like.

A central section of the pulley, over which the STM is driven, has preferably the same width of the central section of counter pulley and preferably features circumferential and/or axial grooves or indentations and/or may further feature surface structuring to facilitate and improve alignment and friction of the STM.

In a further embodiment of the present invention, the surface of the STM facing the counter pulley features circumferential and/or axial grooves or indentations and/or surface structuring. In this case the counter pulley complementarily features circumferential and/or axial grooves or indentations and/or surface structuring respectively. This further improves the alignment of the STM, in other words, the STM also by guided the counter pulley.

In a further embodiment of the present invention, the counter pulley comprises means for detecting movement of the counter pulley and/or movement of the pulley. For detecting the movement of the pulley, the axes of rotation of the counter pulley and the pulley could be connected in such a manner, that a change of distance between the two axes can be detected. This preferred embodiment is particularly advantageous when the counter pulley is positioned in such a manner that the STM is not contacting the counter pulley when the STM is correctly guided over the pulley. Detecting a rotation and/or movement of the counter pulley can be used to monitor the position of the STM and to take the necessary countermeasures, e.g. stopping the elevator if wrong positioning of the STM is detected while driving the car.

The elevator system preferably further comprises means for stopping the elevator system if movement of the counter pulley is detected.

DESCRIPTION OF THE DRAWINGS

The invention will now be described by preferred embodiments. The figures show:

FIG. 4: a schematic side view of a car with a second preferred embodiment of the present invention.

DETAILED DESCRIPTION

Figure 2:
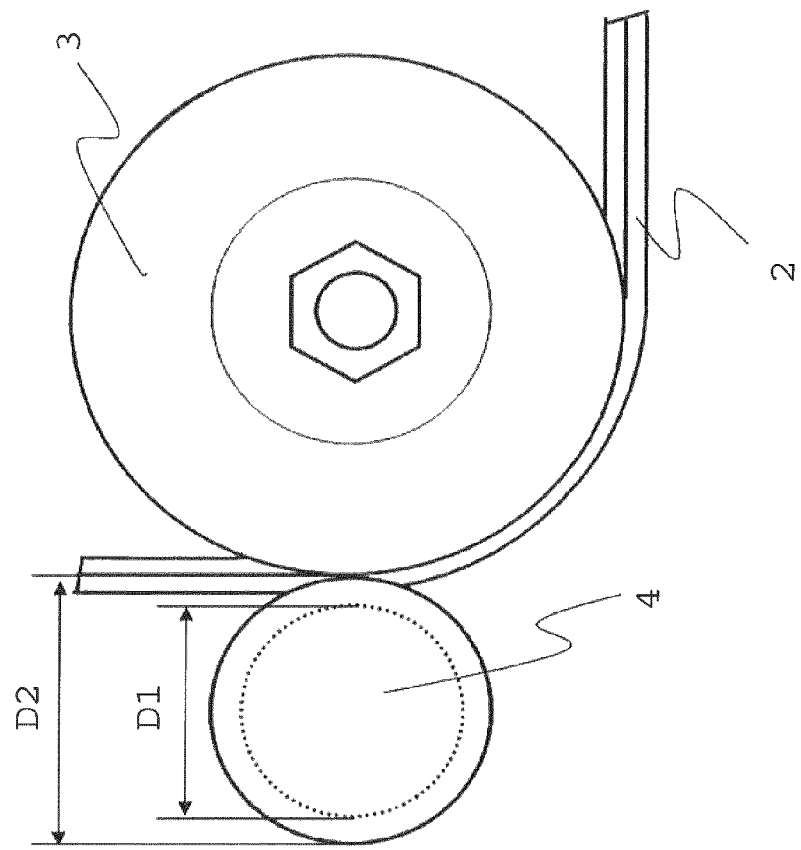
FIG. 2: a side view of the preferred embodiment of FIG. 1.
Figure 1:
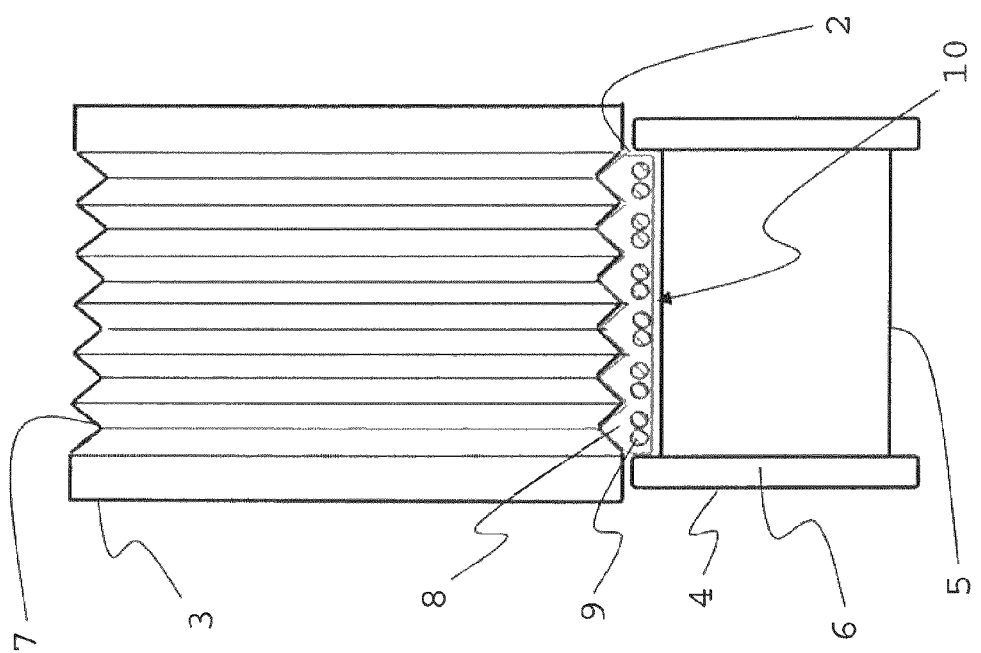
FIG. 1: a schematic top view of a first preferred embodiment of the invention.

In FIGS. 1 and 2 a schematic arrangement of a preferred embodiment of the present invention is shown. The arrangement comprises a pulley 3, over which a STM 2 is guided. The pulley 3 features a central section with a plurality of V-shaped grooves 7, which engage with correspondingly shaped indentations forming ribs 8 of the STM 2, facilitate alignment and prevent axial motion of the STM 2.

The STM 2 comprises plastic material reinforced with a plurality of longitudinally arranged wires 9 made of a strong and high-tensile material like Kevlar or the like.

When the STM 2 is not held taut enough, e.g. when the elevator system is suddenly stopped, or because the STM 2 is subject to diagonal pulling, the ribs 8 may disengage from the grooves 7 with the result that the STM 2 may slip or jump off the pulley 3.

To avoid this problem, a counter pulley 4 is located adjacent to the pulley 3 and with its rotating axis substantially parallel to the rotating axis of the pulley 3. The counter pulley 4 features a central section 5 with a first diameter D1 (see FIG. 2), whereby the lateral end parts of the counter pulley 4 build side walls 6 with a second diameter D2 larger than the first diameter D1, thus forming a slot 10 for the STM 2 to be guided therethrough.

The counter pulley 4 is arranged in such a manner that the STM 2 is not touched by it when the STM 2 is correctly aligned, the grooves 7 are engaging the ribs 8 and/or the STM 2 is held taut.

The central section 5 builds an abutment for the STM 2 and prevents the STM 2 from moving too far away from the pulley 3, keeping the STM 2 axially aligned.

The side walls 6 further limit the possible movement of the STM 2 laterally, thus avoiding the STM 2 from slipping or jumping off the pulley 3.

Because the counter pulley 4 is only contacted by the STM 2 when the latter is not correctly positioned, wear of the backside of the STM 2 is reduced.

Figure 3:
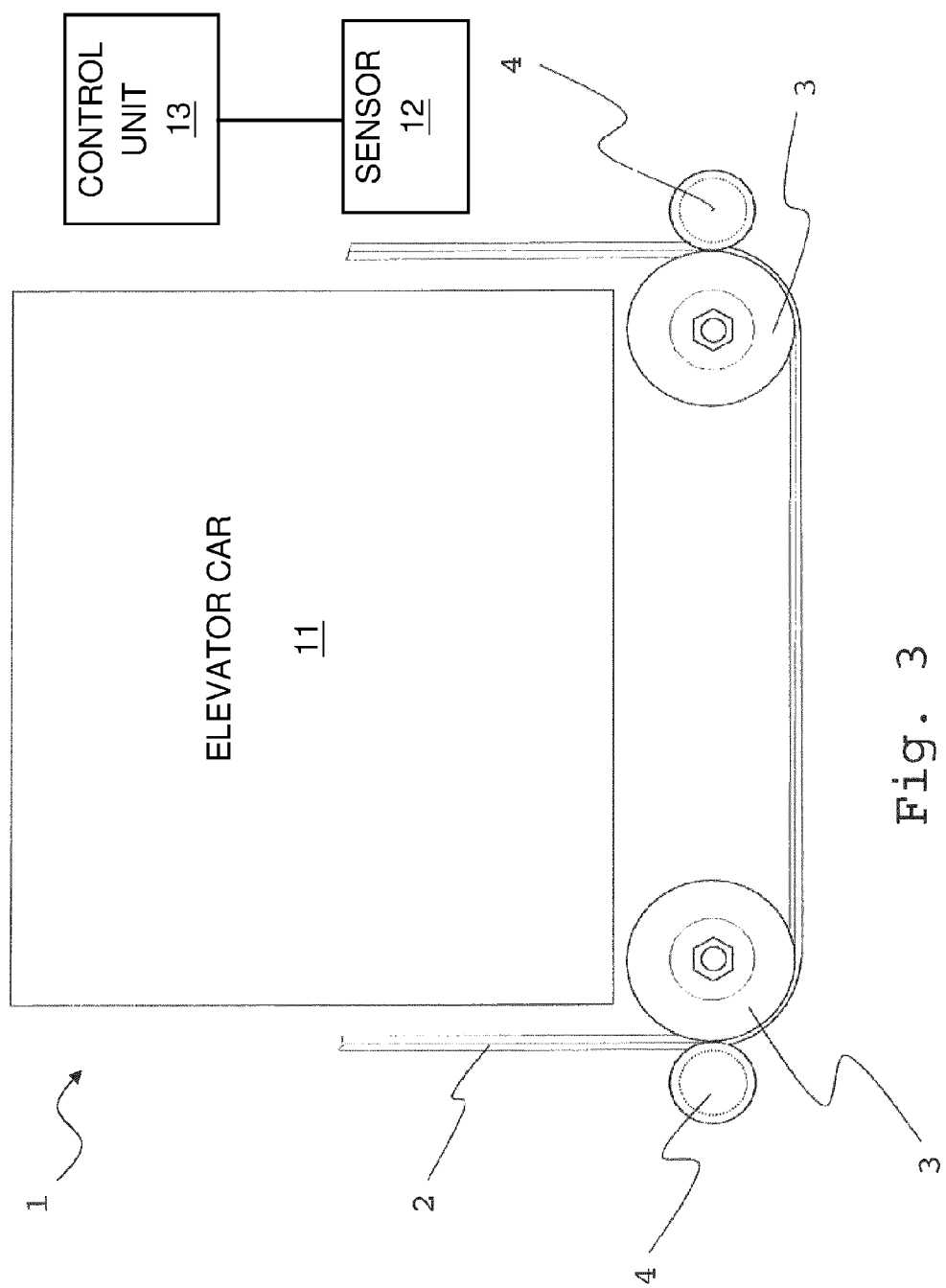
FIG. 3: a schematic side view of a car with the first preferred embodiment of the present invention.

In FIG. 3, a preferred embodiment of an elevator system 1 is shown. Two pulleys 3 are placed under an elevator car 11, whereby each pulley 3 features a counter pulley 4 as shown in FIGS. 1 and 2 located laterally, whereby the rotating axis of both the pulleys 3 and pulleys 4 lie substantially in a common plane. The STM 2 is respectively guided between the first pulley 3 and counter pulley 4 and the second pulley 3 and counter pulley 4 with an arc of contact around the pulley 3 of about 90°. The STM 2 is then further guided through additional elevator drive components such as support pulleys in the hoistway and at a counterweight, and a leading sheave, which may also feature a counter pulley according to the present invention and, for the sake of convenience, are not shown in the figures.

Movement of one or more of the pulleys 3, 4 can be detected by a sensor 12 connected to a control unit 13. Upon detection of such movement, the control unit 13 stops the elevator system 1.

In FIG. 4, a second preferred embodiment of an elevator system 1 is shown. The elevator system 1 of FIG. 4 is similar to the elevator system shown in FIG. 3. However, every pulley 3 features two counter pulleys 4 located laterally and under the pulley 3 respectively. The STM 2 is then guided between the pulley 3 and the counter pulleys 4 with an arc of contact of about 90°. The counter pulleys 4 are arranged adjacent the pulley 3 with their rotating axis about 90° offset with reference to the rotating axis of the pulley 3.

As for the elevator system 1 shown in FIG. 3, the elevator system 1 of FIG. 4 may also include additional pulleys, which themselves may also feature one or a plurality of counter pulleys as shown in FIG. 4.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. An elevator system including a suspension traction means guided over a pulley, wherein the pulley is driven by the suspension traction means, and at least one counter pulley located adjacent to the pulley, wherein the suspension traction means is guided between the pulley and the at least one counter pulley, comprising:

the counter pulley having a central section with a first diameter and at least one side wall with a second diameter larger than the first diameter, wherein the suspension traction means is not in contact with the counter pulley when the suspension traction means is correctly guided over the pulley.

2. The elevator system according to claim 1 wherein the central section has a first width and the pulley has a second width, a ratio of the second width to the first width being between 1 and 1.8, preferably 1.125.

3. The elevator system according to claim 2 wherein the ratio of the second width to the first width is 1.125.

4. The elevator system according to claim 1 wherein a difference between the first diameter and the second diameter is greater than or equal to 4 cm.

5. The elevator system according to claim 4 wherein the difference between the first diameter and the second diameter is 6.2 cm.

6. The elevator system according to claim 1 wherein the pulley is a car pulley.

7. The elevator system according to claim 1 including another counter pulley located adjacent to the pulley.

8. The elevator system according to claim 1 wherein the suspension traction means is belt shaped.

9. The elevator system according to claim 1 wherein the suspension traction means is made of a plastic material.

10. The elevator system according to claim 1 wherein the pulley has a central portion, over which the suspension traction means is driven, with at least one of circumferential grooves, axial grooves, indentations and surface structuring.

11. The elevator system according to claim 1 including a sensor for detecting movement of at least one of the counter pulley and the pulley.

12. The elevator system according to claim 11 including a control unit for stopping the elevator system in response to detection of movement of the counter pulley by the sensor.

13. The elevator system according to claim 1 wherein the counter pulley has an axis of rotation, whereby a position of the axis is alterable.

* * * * *